United States Patent Office 2,759,951
Patented Aug. 21, 1956

2,759,951
CYCLOPENTANOPHENANTHRENE DERIVATIVES AND COMPOUNDS

Carl Djerassi, George Rosenkranz, and Luis L. Miramontes, Mexico City, Mexico, assignors to Syntex S. A., Mexico City, Mexico, a corporation of Mexico No Drawing. Application October 5, 1951, Serial No. 250,036

Claims priority, application Mexico June 4, 1951

8 Claims. (Cl. 260—397.3)

The present invention relates to certain novel cyclopentanophenanthrene derivatives and to processes for the production thereof.

More particularly the present invention relates to a novel $\Delta^4$-19-norpregnen-3,20-dione (19-norprogesterone), a novel homologue of progesterone lacking the angular methyl group in position 10 of progesterone and having superior progestational activity.

A 19-norprogesterone has been disclosed and previously synthesized by Ehrenstein (J. Org. Chem. 9, 435 (1944). The compound obtained by Ehrenstein is described as a resin $(\alpha)_D+89°$ supposedly consisting of a mixture of isomers with a predominance of the 14-iso-17-iso configuration (Ehrenstein et al., Chem. Rev. 42, 475 (1948); J. Org. Chem. 16, 355 (1951); Plattner et al., Helv. Chim. Acta, 31, 249 (1948).

In accordance with the present invention a 19-norprogesterone has been obtained which is clearly different from the compound obtained by Ehrenstein. In addition to having a distinct melting point and an entirely different optical rotation, $(\alpha)_D^{20}+147°$, the present compound possesses the same natural configuration at C–14 and C–17 as progesterone. Further, it is believed that the configuration at the 10 carbon atom is $\beta$, since this is the most stable configuration produced in accordance with the hereinafter set forth process. Further, the novel 19-norprogesterone of the present invention has a progestational activity from 3–5 times greater than that of progesterone itself. In addition to the high biological and therapeutical potency of the present novel compound, it is further desired to point out that the 19-norprogesterone is a valuable intermediate for the total synthesis of progestational and cortical hormones.

The novel process according to the present invention may form a part of a total synthesis of 19-norprogesterone, since the starting material, 3-alkyloxy-17-acetyl-1,3,5(10)-estratriene, is conventionally obtained by the etherification of the known 3-hydroxy-17-acetyl-1,3,5(10)-estratriene (Djerassi, Rosenkranz, Iriarte, Berlin and Romo, J. Am. Chem. Soc. 73, 1523 (1950), this compound having also been prepared from estrone, (Velluz and Muller, Bull. Soc. Chim. France, 166 (1950). Since estrone has been totally synthesized (Johnson et al., J. Am. Chem. Soc., 72, 1426 (1950) and Anner and Miescher, Helv. Chim. Acta., 31, 2173 (1948), it is evident that the present process forms a valuable step in the total synthesis of 19-norprogesterone.

In addition, the present invention relates to certain other novel intermediates possessing the $\Delta^{2,5(10)}$-19-nor-pregnen structure and the $\Delta^4$-19-norpregnen structure. The novel process according to the present invention may be illustrated by the following equation:

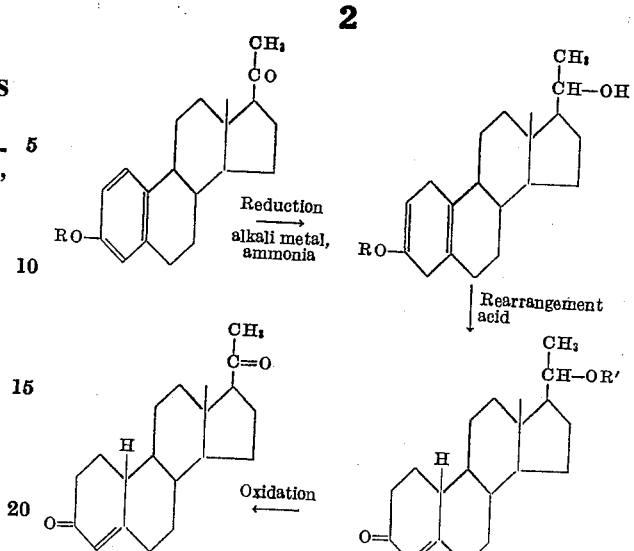

In the above equation R is a suitable alkyl group, preferably a lower alkyl group, such as methyl or ethyl, and $R^1$ represents hydrogen or the residue of an organic acid, preferably a lower fatty acid, such as acetic or propionic, although any organic acid commonly used for esterification of steroid hormones may be thus designated and the corresponding compound employed in the present process.

In practicing the present invention according to the above equation, the starting compound, as for example 3-methoxy-17-acetyl-1,3,5(10)-estratriene was added to an alkali metal, such as lithium or sodium dissolved in liquid ammonia. Preferably the starting material is previously dissolved in a suitable solvent, such as absolute ethanol and anhydrous ether, and is added to the liquid ammonia solution of the alkali metal dropwise over a period of time of approximately 15 minutes, followed by the addition of additional solvent, such as absolute ethanol. The novel blue color produced disappears when the reaction is complete, and water is then added. Thereafter the reaction mixture is left to evaporate overnight at room temperature to remove excess ammonia and the residue is collected with water and extracted with a suitable solvent, such as a mixture of ether and ethyl acetate. The extract is then washed until neutral, dried and evaporated to dryness to produce a pale yellow oil which, upon crystallization from acetone, gave $\Delta^{2,5(10)}$-19-nor-3-methoxy - 20 - hydroxypregnadiene (the corresponding estradiene derivative of 3-methoxy-17-acetyl-1,3,5(10)-estratriene), as indicated above. However, it was unnecessary to crystallize the compound indicated, the pale yellow oil being preferably used directly for the second step, i. e. rearrangement in acid medium. For the second step the oil was refluxed for a short period of time with a lower alcohol, preferably methanol, and concentrated mineral acid, preferably hydrochloric. The reaction mixture resulting was then purified and extracted and after drying passed through a column of alumina and diluted with a suitable solvent, such as a mixture of benzene and ether. The product was $\Delta^4$-19-norpregnen-20-ol-3-one. The corresponding 20-esters of this compound could be obtained by conventional acylation with an organic acid, as for example acetic or propionic to produce the corresponding 20-acetate or propionate.

The $\Delta^4$-19-norpregnen-20-ol-3-one could be oxidized with a suitable oxidizing agent commonly used for oxidation of the 20-hydroxy group of steroids, such as chromic acid to produce the 19-norprogesterone.

Although the above process has been described starting with a 3-alkyloxy-17-acetyl-1,3,5(10)-estratriene, it is within the broad scope of the present invention to utilize for a starting material any corresponding compound. For example, compounds could be utilized having double bonds at positions 6,7; 7,8; 9,11; or 11,12 of the molecule. Further, the steroid nucleus could be substituted with hydroxy or keto groups, the corresponding esters or ethers of the hydroxy groups at positions 11, 12, 17, and/or 21 of the molecule. Upon reaction with these derivatives of the starting compounds indicated the corresponding 3 - alkyloxy-$\Delta^{2,5(10)}$ - estradiene derivatives would be prepared and from the estradiene derivatives the corresponding $\Delta^4$-19-norpregnen-20-ol-3-one derivatives and from this last type of compound the corresponding $\Delta^4$-19-norpregnen-3,20-dione derivative.

The following specific examples serve to illustrate but are not intended to limit the present invention:

EXAMPLE I $\Delta^{2,5(10)}$-19-nor-3-methoxy-20-hydroxypregnadiene 8 g. of lithium metal (wire) were dissolved in 1 lt. of liquid ammonia in a Dewar flask provided with a mechanical stirrer, and in a period of approximately 15 minutes, a solution of 1 g. of 3-methoxy-17-acetyl-1,3,5-estratriene in 40 ml. of absolute ethanol and 200 ml. of anhydrous ether was added drop by drop, followed by the addition of 30 ml. more of absolute ethanol. After the blue color had disappeared, 50 ml. of water were added.

The ammonia was left to evaporate overnight at room temperature, the residue was collected with water and extracted with a mixture of ether and ethyl acetate. The extract was washed until neutral, dried and evaporated to dryness. 0.86 g. of a pale yellow oil was obtained. A sample was crystallized from acetone, giving the enol ether of $\Delta^{2,5(10)}$-19-nor-3-methoxy-20-hydroxypregnadiene, melting point 135–138° C. $(\alpha)_D^{20}+88°$. It showed no selective absorption in the ultraviolet and the infrared showed the presence of a free hydroxy group.

EXAMPLE II

Working under the conditions described in Example I, but using 8 g. of sodium instead of lithium, 0.84 g. of oil was obtained, which, on crystallization from acetone, gave crystals identical to the ones obtained according to Example I.

EXAMPLE III $\Delta^4$-19-norpregnen-20-ol-3-one

The oil obtained according to Example I (0.86 g.) was refluxed during one-half hour with 25 ml. of methanol and 15 ml. of 4N. hydrochloric acid. The reaction mixture was poured in 250 ml. of saturated sodium chloride solution and extracted with four portions of ethyl acetate; the extract was washed with water until neutral, dried and evaporated to dryness. The residue (0.77 g.) was passed through a column of alumina and eluted with benzene-ether (1:1). In this manner, 0.65 g. of colorless crystals were obtained, melting point 160–168° C., $(\alpha)_D^{20}+44°$, ultra-violet maximum at 240 mu, (log E 4.26). The product was sufficiently pure for use in the preparation described in Example IV. The analytical sample of the product $\Delta^4$-19-norpregnen-20-ol-3-one was obtained by crystallization from hexane-ethyl acetate, melting point 174–177° C., $(\alpha)_D^{20}+42°$, ultra-violet maximum at 240 $m\mu$, (log E 4.37), infrared bands at 3617 cm.$^{-1}$ (free hydroxy group) and 1678 cm.$^{-1}$ ($\Delta^4$-3-keto).

The acetate of $\Delta^4$-19-norpregnen-20-ol-3-one was obtained by acetylation by known methods and crystallized from ethyl acetate; it had a melting point of 178–179° C., $(\alpha)_D^{20}+41°$, ultraviolet maximum at 240 mu (log E 4.35), infrared carbonyl band at 1736 cm.$^{-1}$ (acetate) and 1674 cm.$^{-1}$ ($\Delta^4$-3-keto); it did not show the band characteristic of free hydroxy groups.

EXAMPLE IV $\Delta^4$-19-norpregnen-3,20-dione (19-norprogesterone)

0.65 g. of the product obtained according to Example III ($\Delta^4$-19-norpregnen-20-ol-3-one) was dissolved in 15 ml. of glacial acetic acid, and keeping the temperature below 20° C., a solution of 0.15 g. of chromic acid in 1 ml. of water and 5 ml. of acetic acid was added drop by drop. After standing during 90 minutes at room temperature, methanol was added to destroy the excess oxidizing agent and the solution was evaporated to dryness under vacuum (22 mm. Hg). The residue was extracted with ether, washed until neutral, dried, evaporated and crystallized from methanol.

Yield 0.54 g., melting point 142–145° C., $(\alpha)_D^{20}+154°$.

The analytical sample of 19-norprogesterone had a melting point of 144–145° C., $(\alpha)_D^{20}+147°$, ultra-violet maximum at 240 mu (log E 4.26), infrared carbonyl bands at 1706 cm.$^{-1}$ (20-ketone) and 1674 cm.$^{-1}$ ($\Delta^4$-3-ketone); it showed no free hydroxy band.

We claim:

1. A new process for the reduction of 3-alkyloxy-17-acetyl-1,3,5(10) estratriene derivatives which comprises reducing the estratriene compound with a solution of alkali metal in liquid ammonia to produce the corresponding 3-alkyloxy-$\Delta^{2,5(10)}$-estradiene derivative.

2. A new method for the preparation of a 19-norprogesterone comprising reducing a 3-alkyloxy-17-acetyl-1,3,5(10)-estratriene compound with an alkali metal in liquid ammonia to produce the corresponding 3-alkyloxy-$\Delta^{2,5(10)}$-estradiene derivative, thereafter rearranging said estradiene derivative in acid medium to produce a $\Delta^4$-19-norpregnen-20-ol-3-one derivative and finally oxidizing the 20-ol compound thus produced to produce the corresponding $\Delta^4$-19-norpregnen-3,20-dione compound.

3. A new compound consisting of $\Delta^{2,5(10)}$-19-nor-3-lower alkyloxy-20-hydroxy pregnadiene.

4. A new compound consisting of $\Delta^{2,5(10)}$-19-nor-3-methoxy-20-hydroxy pregnadiene having a melting point of 135–138° C.

5. A new $\Delta^4$-norpregnen compound selected from the class consisting of $\Delta^4$-norpregnen-20-ol-3-one and 20 lower fatty acid esters thereof.

6. A new compound consisting of $\Delta^4$-norpregnen-20-ol-3-one having a melting point of 174–177° C.

7. A new compound consisting of the 20-acetate of $\Delta^4$-norpregnen-20-ol-3-one having a melting point of 178–179° C.

8. A crystalline $\Delta^4$-19-norpregnene-3,20-dione having the following structural formula:

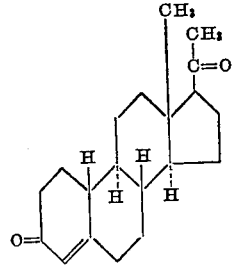

a progestational activity at least four times as great as progesterone, a melting point of 144°–145° C., and an $[\alpha]_D$ of $+147°$.

References Cited in the file of this patent

UNITED STATES PATENTS

| | | |
|---|---|---|
| 2,530,816 | Ehrenstein | Nov. 21, 1950 |
| 2,530,817 | Ehrenstein | Nov. 21, 1950 |

OTHER REFERENCES

Fieser et al.: Natural Products Related to Phenanthrene, 3rd ed., pp. 521–22, 544, 620 (1949).